(12) United States Patent
Peck et al.

(10) Patent No.: US 12,191,645 B2
(45) Date of Patent: Jan. 7, 2025

(54) CABLE HANGER

(71) Applicant: Gamechange Solar Corp., Norwalk, CT (US)

(72) Inventors: David Peck, Danbury, CT (US); Claude Colp, Hingham, MA (US)

(73) Assignee: GAMECHANGE SOLAR CORP., Norwalk, CT (US)

( * ) Notice: Subject to any disclaimer, the term of this patent is extended or adjusted under 35 U.S.C. 154(b) by 0 days.

(21) Appl. No.: 18/198,487

(22) Filed: May 17, 2023

(65) Prior Publication Data

US 2024/0305077 A1 Sep. 12, 2024

Related U.S. Application Data

(60) Provisional application No. 63/345,293, filed on May 24, 2022.

(51) Int. Cl.
| | |
|---|---|
| F16L 3/00 | (2006.01) |
| F16L 3/08 | (2006.01) |
| F16L 3/23 | (2006.01) |
| H02G 3/00 | (2006.01) |
| H02G 3/04 | (2006.01) |
| F16L 3/02 | (2006.01) |
| F16L 3/133 | (2006.01) |
| H02G 3/30 | (2006.01) |
| H02G 3/32 | (2006.01) |
| H02S 40/30 | (2014.01) |

(52) U.S. Cl.
CPC ........... *H02G 3/0456* (2013.01); *H02G 3/263* (2013.01); *F16L 3/00* (2013.01); *F16L 3/02* (2013.01); *F16L 3/08* (2013.01); *F16L 3/133* (2013.01); *F16L 3/23* (2013.01); *H02G 3/00* (2013.01); *H02G 3/30* (2013.01); *H02G 3/32* (2013.01); *H02S 40/30* (2014.12)

(58) Field of Classification Search
CPC ........ H02G 3/0456; H02G 3/263; H02G 3/22; H02G 3/24; H02G 3/26; H02G 3/32; H02S 40/30; F16L 3/00; F16L 3/02; F16L 3/04; F16L 3/133; F16L 3/23
See application file for complete search history.

(56) References Cited

U.S. PATENT DOCUMENTS 3,363,865 A * 1/1968 Metsker ................ F16L 3/1025
24/271
5,533,696 A * 7/1996 Laughlin ................... F16L 3/12
248/74.1

(Continued)

*Primary Examiner* — Tan Le

(57) ABSTRACT

A cable hanger assembly comprises a cable hanger for attachment to a mounting surface includes a base surface having a proximate end and a distal end, a first sidewall extending substantially perpendicularly from a proximate end of the base surface, where a first hook extends from a distal end of the first sidewall, and a second sidewall extending substantially perpendicularly from a distal end of the base surface. The cable hanger also includes a resilient attachment surface extending from a distal end of the second sidewall, where the attachment surface includes a resilient tongue segment extending from a sidewall surface of an opening in the attachment surface and extending substantially parallel with the resilient attachment surface and the base surface, where the resilient tongue segment includes a plurality of offset surfaces.

16 Claims, 5 Drawing Sheets

(56) References Cited

U.S. PATENT DOCUMENTS

| | | | | |
|---|---|---|---|---|
| 5,639,049 A | * | 6/1997 | Jennings | F16L 3/123 |
| | | | | 248/301 |
| 5,961,081 A | * | 10/1999 | Rinderer | H02G 3/32 |
| | | | | 248/68.1 |
| 6,517,031 B2 | * | 2/2003 | Uchiyama | B60T 17/046 |
| | | | | 248/68.1 |
| 9,835,272 B1 | * | 12/2017 | Handler | H02G 3/0406 |
| 2003/0213876 A1 | * | 11/2003 | Takeuchi | H05K 7/12 |
| | | | | 248/74.1 |
| 2008/0093510 A1 | * | 4/2008 | Oh | F16L 3/2235 |
| | | | | 248/63 |
| 2013/0168509 A1 | * | 7/2013 | Chen | H05K 7/1421 |
| | | | | 248/74.1 |

* cited by examiner

CABLE HANGER

CROSS REFERENCE TO RELATED APPLICATIONS

This application claims the benefit of U.S. Provisional Patent Application Ser. No. 63/345,293 filed May 24, 2022, which is hereby incorporated by reference.

BACKGROUND OF THE INVENTION

1. Technical Field

This disclosure relates generally to cable hangers, and in particular to a cable hanger assembly for use with solar panel mounting systems.

2. Background Information

Cable hangers are known for suspending cables (e.g., power and data) from a messenger wire or other support. As utility scale solar plants have increased in scope there is a greater need to handling the increased number of cables that are suspended from the racking or tracker systems. There is a need for improved cable hangers, for example, for use in a system that includes an array of solar panels, for improved cable management.

SUMMARY OF THE DISCLOSURE

According to an aspect of the disclosure, a cable hanger for attachment to a mounting surface includes a base surface having a proximate end and a distal end, a first sidewall extending substantially perpendicularly from a proximate end of the base surface, where a first J-hook extends from a distal end of the first sidewall, and a second sidewall extending substantially perpendicularly from a distal end of the base surface. The cable hanger also includes a resilient attachment surface extending from a distal end of the second sidewall, where the attachment surface includes a resilient tongue segment extending from a sidewall surface of an opening in the attachment surface and extending substantially parallel with the resilient attachment surface and the base surface, where the resilient tongue segment includes a plurality of offset surfaces and where a second J-hook extends from a distal end of the resilient attachment surface and when the first and second J-hooks are engaged, the base surface, the first and second sidewalls and the attachment surface form a closed cable carrying area configured and arranged for cables to rest on the base surface surrounded by the base surface, the first and second sidewalls and the attachment surface. The cable hanger is attached to the mounting surface by sliding the cable hanger such that the resilient attachment surface is below and contacting the mounting surface and the resilient tongue segment above and contacting the mounting surface.

The first J-hook may include a tab extending therefrom and having a tab width, and the second J-hook includes a slot whose width is large enough to accept the tab and couple the first and second hooks.

The first sidewall may include at least one first sidewall opening and the second sidewall includes at least one second sidewall opening.

The resilient tongue segment may include a serrated edge that points downwardly from a plane formed by the resilient attachment surface to bite into the mounting surface to electrically bond the cable hanger to the mounting surface.

The resilient tongue segment may comprise a plurality of offset surfaces including a distal end offset surface, where the distal end offset surface is sloped upwardly relative to the resilient attachment surface and extends above the resilient attachment surface.

The cable hanger may further comprise a first radiused edge between the base surface and the first sidewall.

The cable hanger may further comprise a second radiused edge between the base surface and the second sidewall.

The cable hanger may further comprise a third radiused edge between the second sidewall and the resilient attachment surface to provide flexure of the resilient attachment surface.

The cable hanger may further comprise a fourth radiused edge between the resilient attachment surface and the second hook.

The cable hanger may be a unitary metallic structure.

The cable hanger may be a unitary plastic structure.

The cable hanger may be semi-metallic.

The second J-hook may comprise a first segment, a second segment and a radiused segment between the first and second segments, where the slot spans the first segment and the radiused segment.

The first segment and the resilient attachment surface may be separated by a radiused surface, where the first segment extends towards the base surface and contacts a first end on the radiused segment.

The second segment may contact a second end on the radiused segment and extends away from the base surface.

According to another aspect of the disclosure, a cable hanger for attachment to a mounting surface includes a base surface having a proximate end and a distal end, a first sidewall extending substantially perpendicularly from a proximate end of the base surface, where a first hook extends from a distal end of the first sidewall, and a second sidewall extending substantially perpendicularly from a distal end of the base surface. The cable hanger also includes a resilient attachment surface extending from a distal end of the second sidewall, where the attachment surface includes a resilient tongue segment extending from a sidewall surface of an opening in the attachment surface and extending substantially parallel with the resilient attachment surface and the base surface, where the resilient tongue segment includes a plurality of offset surfaces and where a second hook extends from a distal end of the resilient attachment surface and when the first and second hooks are engaged, the base surface, the first and second sidewalls and the attachment surface form a closed cable carrying area configured and arranged for cables to rest on the base surface surrounded by the base surface, the first and second sidewalls and the attachment surface. The cable hanger is attached to the mounting surface by sliding the cable hanger such that the resilient attachment surface is below and contacting the mounting surface and the resilient tongue segment above and contacting the mounting surface.

The foregoing features and the operation of the invention will become more apparent in light of the following description and the accompanying drawings.

DETAILED DESCRIPTION

Figure 1:
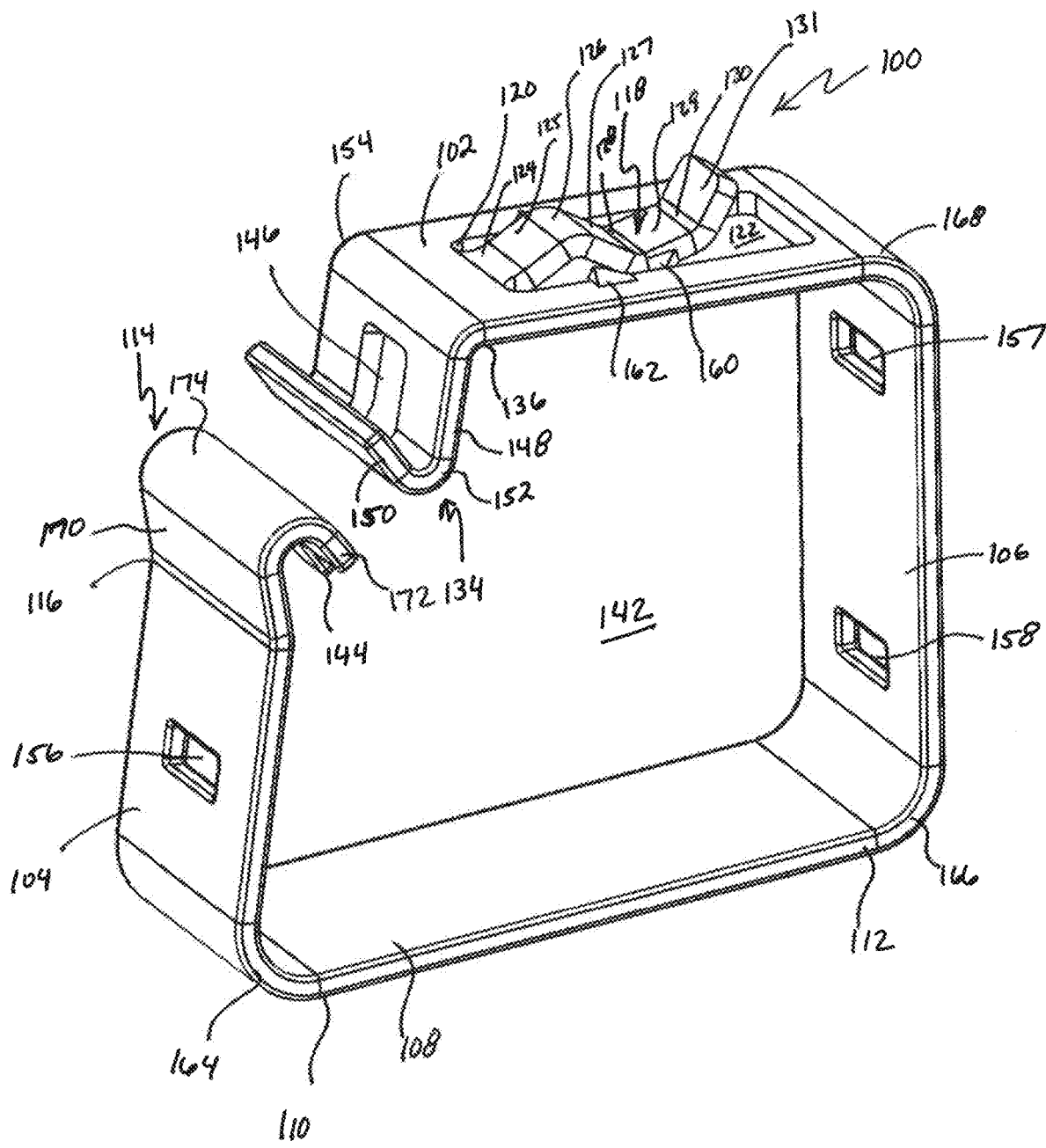
FIG. 1 illustrates a perspective view of a cable hanger.
Figure 2:
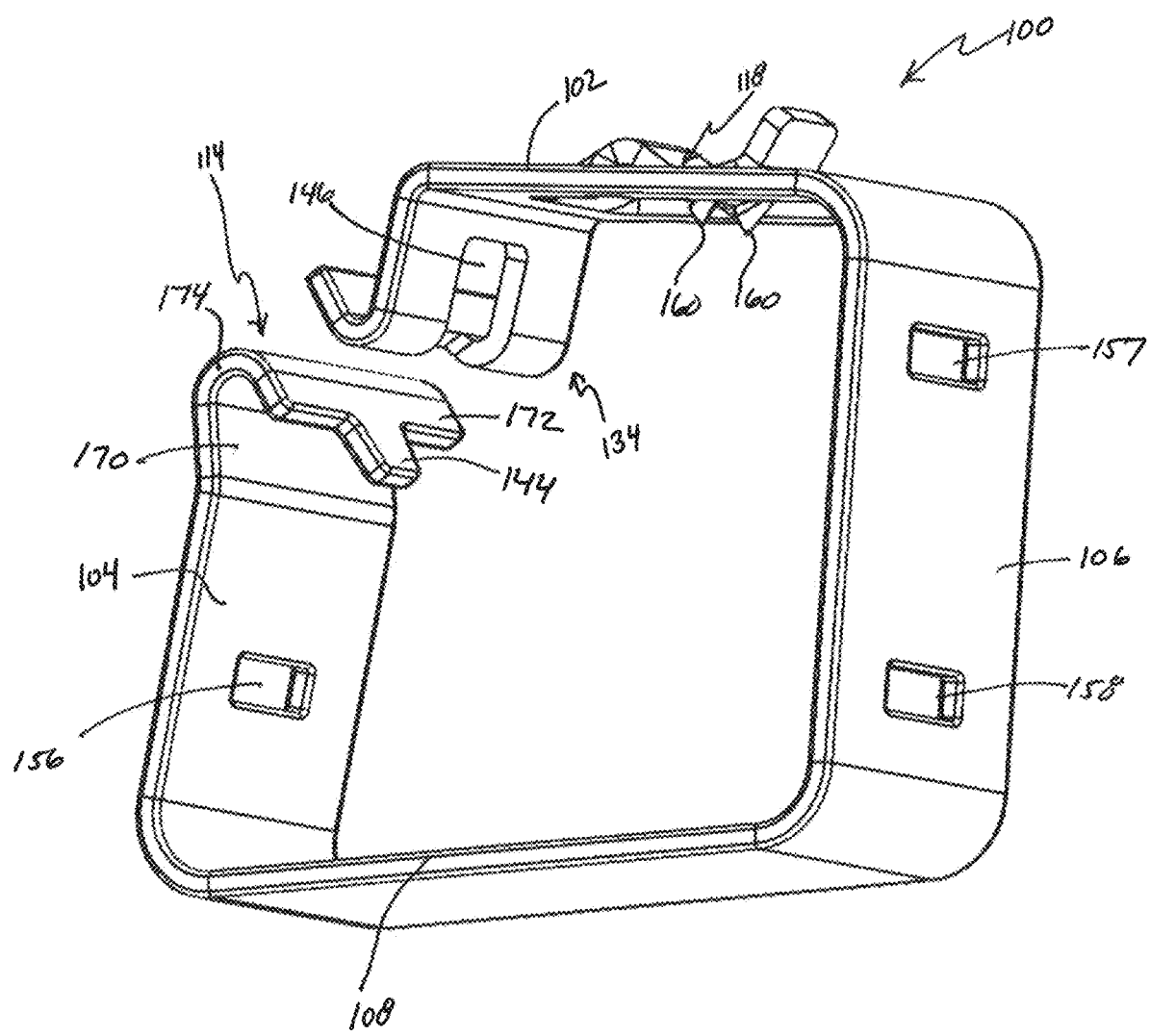
FIG. 2 illustrates a second perspective of the cable hanger of FIG. 1.
Figure 3:
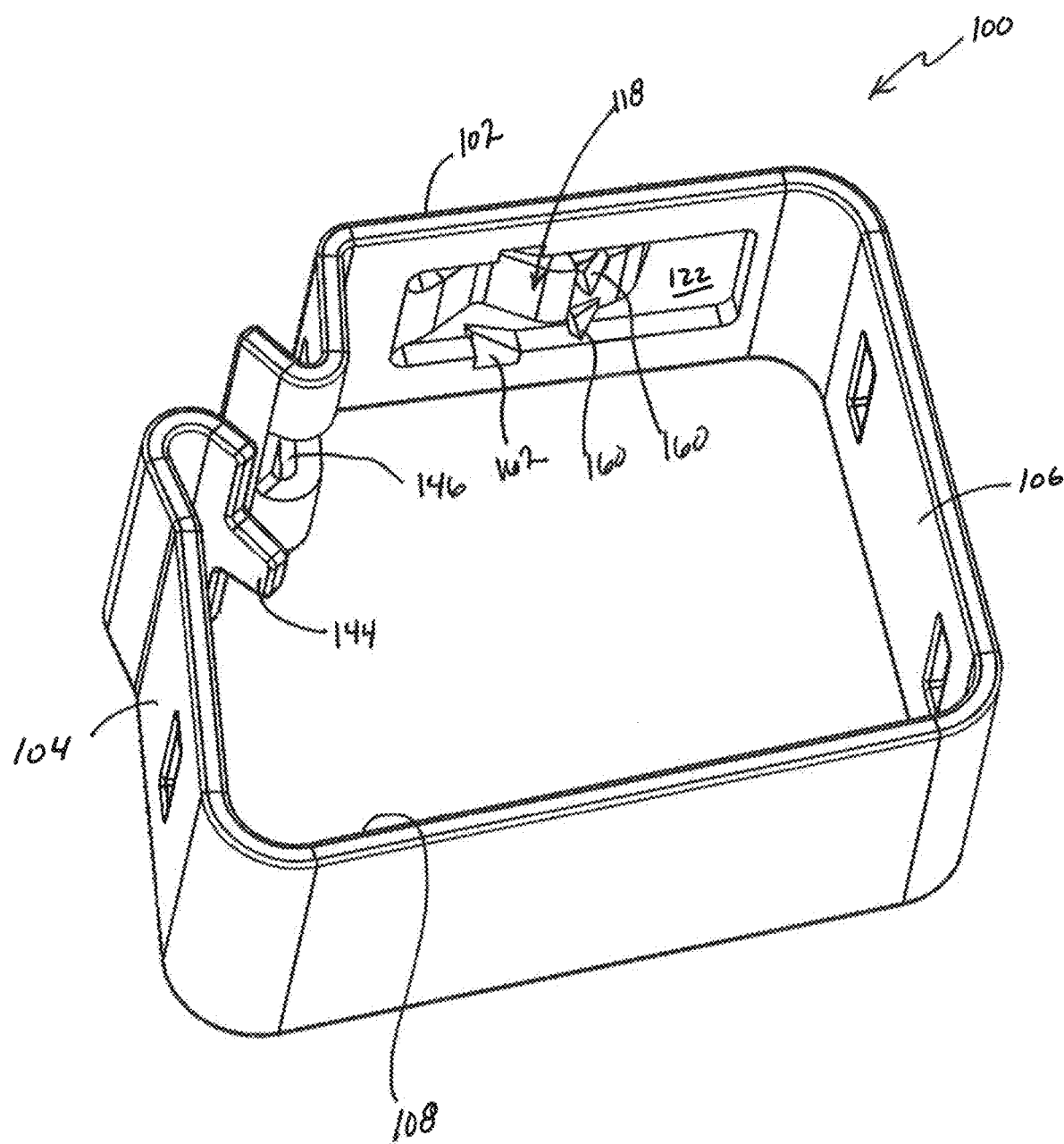
FIG. 3 illustrates a third perspective of the cable hanger of FIGS. 1-2.

FIG. 1 illustrates a perspective view of a cable hanger 100. FIG. 2 illustrates a second perspective of the cable hanger 100 of FIG. 1. FIG. 3 illustrates a third perspective of the cable hanger 100 of FIGS. 1-2. Referring to FIGS. 1-3, the cable hanger 100 includes a resilient attachment surface 102, a first sidewall 104, a second sidewall 106 and a base surface 108. The base surface includes a proximate end 110 and a distal end 112. The first sidewall 104 extends (e.g., substantially perpendicularly) from the proximate end 110 of the base surface 108. A first hook 114 (e.g., a J-hook) extends from a distal end 116 of the first sidewall 104.

The second sidewall 106 extends (e.g., substantially perpendicularly) from the distal end 112 of the base surface 108.

The resilient attachment surface 102 extends from a distal end of the second sidewall 106. The resilient attachment surface 102 includes a resilient tongue segment 118 extending from a sidewall surface 120 of an opening 122 in the resilient attachment surface 102 and extends (e.g., substantially parallel) in the direction of the resilient attachment surface 102. The resilient tongue segment 118 includes a plurality of offset surfaces 124-131 (e.g., extending in different planes). A second hook 134 (e.g., a J-hook) extends from a distal end 136 of the resilient attachment surface 102 and when the first and second hooks 114, 134 are engaged the base surface 108, the first and second sidewalls 104, 106 and the resilient attachment surface 102 form a closed cable carrying area 142 configured and arranged for cables (not shown) to rest on the base surface 108 surrounded by the resilient attachment surface 102, the first and second sidewalls 104, 106 and the base surface 108.

The cable hanger 100 may be attached to a mounting surface (not shown in FIGS. 1-3) by sliding the cable hanger 100 such that the resilient attachment surface 102 is below and contacts the mounting surface and the resilient tongue segment 118 is above and contacts the mounting surface.

Referring still to FIGS. 1-3, the first hook 114 includes a tab 144 extending therefrom and having a tab width, and the second hook 134 includes a slot 146 whose width is large enough to accept the tab 144 to couple the first and second hooks 114, 134. The second hook 134 includes a first segment 148, a second segment 150 and a radiused third segment 152 that separates the first and second segments 148, 150. The slot 146 spans the first segment 148 and the radiused third segment 152. The first segment 148 and the resilient attachment surface 102 are separated by a radiused surface 154, where the first segment 148 extends downward from the radiused surface 154 towards the base surface 108.

The sidewalls 104, 106 may include openings 156-158 that allow ties (e.g., wire ties, zip ties, etc.) to pass through to position cables (not shown in FIGS. 1-3) within the closed cable carrying area 142.

The resilient tongue segment 118 includes one or more serrated edges 160 that point downwardly from a plane formed by the resilient attachment surface 102 to bite into the mounting surface (not shown) to electrically bond the cable hanger 100 to the mounting surface. The plurality of the offset surfaces 124-131 of the resilient tongue segment 118 include the distal end offset surface 131 that is sloped upwardly relative to the resilient attachment surface 102 and extends above the resilient attachment surface 102.

The resilient attachment surface 102 may also include a plurality of serrated protrusions 162 extending therefrom to bite into the mounting surface (not shown).

The cable hanger 100 may also include a first radiused edge 164 between the base surface 108 and the first sidewall 104. A second radiused edge 166 may be located between the base surface 108 and the second sidewall 106. A third radiused edge 168 may be located between the second sidewall 106 and the resilient attachment surface 102 to provide flexure of the resilient attachment surface 102. The radiused surface 154 may be located between the resilient attachment surface 102 and the second hook 134.

The cable hanger 100 may be a metallic structure. Alternatively, the cable hanger assembly may be a plastic structure or a semi-metallic structure. The assembly 100 may be unitary, but it contemplated that the assembly may be formed from different elements that are secured together (e.g., welded, brazed, et cetera) to form the cable hanger assembly.

The first J-hook 114 comprises a first segment 170, a second segment 172 and a radiused segment 174 between the first and second segments 170, 172, with the tab 144 extending from the second segment 172. In the open position of the cable hanger 100 (i.e., the tab 144 is not positioned in the slot 146) the tab 144 extends in the direction of the base surface 108 or the second radiused edge 166.

Figure 4:
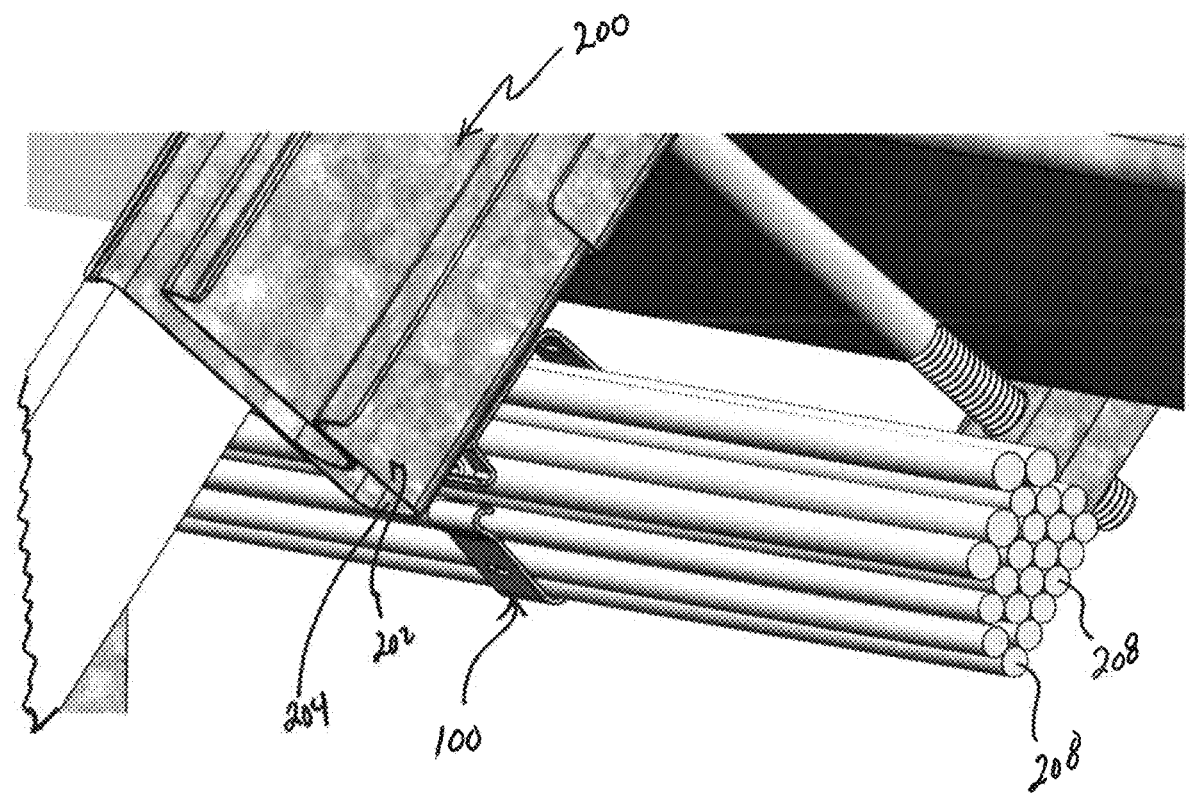
FIG. 4 is a pictorial illustration of the cable hanger of FIGS. 1-3 mounted to a solar panel mounting system.

FIG. 4 is a pictorial illustration of the cable hanger 100 of FIGS. 1-3 mounted to a solar panel mounting system 200. The solar panel mounting system includes a mounting clamp 202 that mounts photovoltaic panels (not shown) to the solar panel mounting system. The mounting clamp 202 includes a mounting surface 204 that includes an opening (not shown) therein that receives the distal end offset surface 131 (FIGS. 1-3) of the cable hanger assembly 100. The hanger assembly is then pushed along the mounting surface 204 in a direction towards the second sidewall 106. This causes the mounting surface 204 to slide under the tongue segment 118 (FIGS. 1-3) and over the attachment surface 102. The resilient tongue segment 118 applies sufficient force to the mounting surface 204 (FIG. 4) to establish a friction fit between the cable hanger 100 and the mounting surface 204. A plurality of cables 208 are shown within the cable carrying area 142 of the cable hanger 100.

Figure 5:
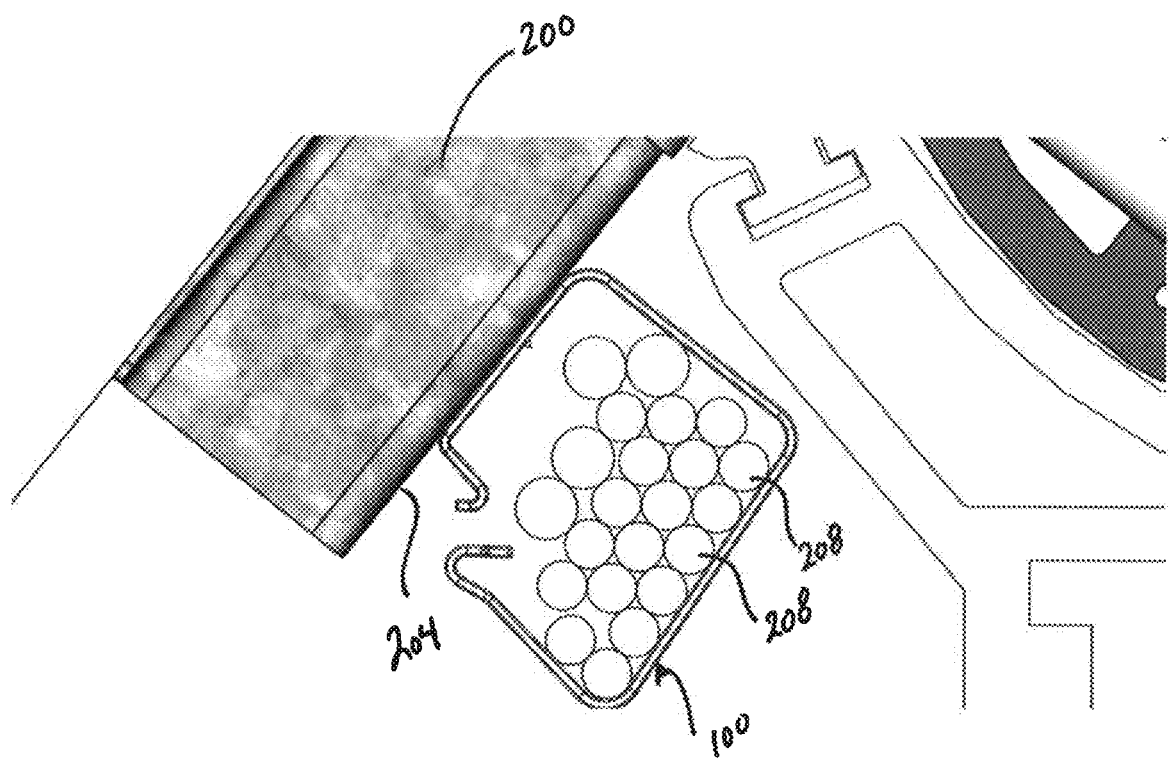
FIG. 5 is a second pictorial illustration of the cable hanger of FIGS. 1-4 mounted to a solar panel mounting system.

FIG. 5 is a second pictorial illustration of the cable hanger of FIGS. 1-3 mounted to a solar panel mounting system.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A cable hanger for attachment to a mounting surface, the cable hanger comprising:
   a base surface having a proximate end and a distal end;
   a first sidewall extending substantially perpendicularly from a proximate end of the base surface, where a first J-hook extends from a distal end of the first sidewall;

a second sidewall extending substantially perpendicularly from a distal end of the base surface; and a resilient attachment surface extending from a distal end of the second sidewall, where the attachment surface includes a resilient tongue segment extending from a sidewall surface of an opening in the attachment surface and extending substantially parallel with the resilient attachment surface and the base surface, where the resilient tongue segment includes a plurality of offset surfaces and where a second J-hook extends from a distal end of the resilient attachment surface and when the first and second J-hooks are engaged the base surface, the first and second sidewalls and the attachment surface form a closed cable carrying area configured and arranged for cables to rest on the base surface surrounded by the base surface, the first and second sidewalls and the attachment surface;

where the cable hanger is attached to the mounting surface by sliding the cable hanger such that the resilient attachment surface is below and contacting the mounting surface and the resilient tongue segment above and contacting the mounting surface.

2. The cable hanger of claim 1, where the first J-hook includes a tab extending therefrom and having a tab width, and the second J-hook includes a slot whose width is large enough to accept the tab and couple the first and second hooks.

3. The cable hanger of claim 1, where the first sidewall includes at least one first sidewall opening and the second sidewall includes at least one second sidewall opening.

4. The cable hanger of claim 1, where the resilient tongue segment includes a serrated edge that points downwardly from a plane formed by the resilient attachment surface to bite into the mounting surface to electrically bond the cable hanger to the mounting surface.

5. The cable hanger of claim 1, where the resilient tongue segment comprises a plurality of offset surfaces including a distal end offset surface, where the distal end offset surface is sloped upwardly relative to the resilient attachment surface and extends above the resilient attachment surface.

6. The cable hanger of claim 1, further comprising a first radiused edge between the base surface and the first sidewall.

7. The cable hanger of claim 6, further comprising a second radiused edge between the base surface and the second sidewall.

8. The cable hanger of claim 7, further comprising a third radiused edge between the second sidewall and the resilient attachment surface to provide flexure of the resilient attachment surface.

9. The cable hanger of claim 8, further comprising a fourth radiused edge between the resilient attachment surface and the second hook.

10. The cable hanger of claim 1, where the cable hanger is a unitary metallic structure.

11. The cable hanger of claim 1, where the cable hanger is a unitary plastic structure.

12. The cable hanger of claim 1, where the cable hanger is semi-metallic.

13. The cable hanger of claim 2, where the second J-hook comprises a first segment, a second segment and a radiused segment between the first and second segments, where the slot spans the first segment and the radiused segment.

14. The cable hanger of claim 12, where the first segment and the resilient attachment surface are separated by a radiused surface, where the first segment extends towards the base surface and contacts a first end on the radiused segment.

15. The cable hanger of claim 13, where the second segment contacts a second first end on the radiused segment and extends away from the base surface.

16. A cable hanger assembly for attachment to a mounting surface, the cable hanger assembly comprising:

a base surface having a proximate end and a distal end;

a first sidewall extending substantially perpendicularly from a proximate end of the base surface, where a first hook extends from a distal end of the first sidewall;

a second sidewall extending substantially perpendicularly from a proximate end of the base surface; and a resilient attachment surface extending from a distal end of the second sidewall, where the attachment surface includes a resilient tongue segment extending from a sidewall surface of an opening in the attachment surface and extending substantially parallel with the resilient attachment surface and the base surface, where the resilient tongue segment includes a plurality of offset surfaces and where a second hook extends from a distal end of the resilient attachment surface and when the first and second hooks are engaged the base surface, the first and second sidewalls and the attachment surface form a closed cable carrying area configured and arranged for cables to rest on the base surface surrounded by the base surface, the first and second sidewalls and the attachment surface;

where the cable hanger assembly is attached to the mounting surface by sliding the cable hanger assembly such that the resilient attachment surface is below and contacting the mounting surface and the resilient tongue segment above and contacting the mounting surface.

\* \* \* \* \*